Figure 1:
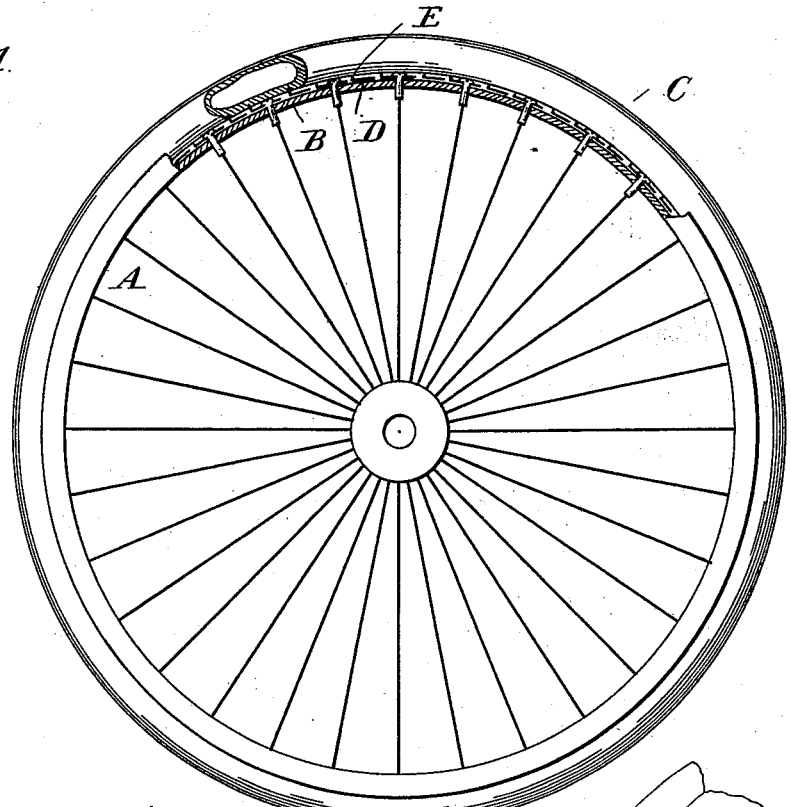

(No Model.)

P. GENDRON.
VEHICLE WHEEL.

No. 510,783. Patented Dec. 12, 1893.

Witnesses
Inventor
Peter Gendron

UNITED STATES PATENT OFFICE.

PETER GENDRON, OF TOLEDO, OHIO, ASSIGNOR TO THE GENDRON IRON WHEEL COMPANY, OF SAME PLACE.

VEHICLE-WHEEL.

SPECIFICATION forming part of Letters Patent No. 510,783, dated December 12, 1893.

Application filed June 30, 1893. Serial No. 479,223. (No model.)

*To all whom it may concern:*

Be it known that I, PETER GENDRON, a citizen of the United States, residing at Toledo, in the county of Lucas and State of Ohio, have invented certain new and useful Improvements in Vehicle-Wheels, of which the following is a specification, reference being had therein to the accompanying drawings.

My invention relates in general to vehicle wheels, provided with rubber tires or other non-metallic tires, and has for its object to provide the rim of a wheel with simple and efficient means for preventing the tire from creeping or becoming displaced.

To this end my invention consists broadly in holding such tires in place and preventing them from creeping by providing the rim of the wheel upon its face where the tire bears against it with projections or pricks, which enter into the base of the tire, all as more fully hereinafter described and shown in the drawings, in which—

Figure 2:
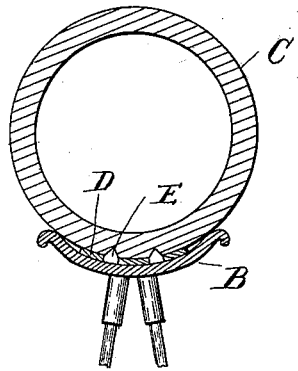
Figure 3:
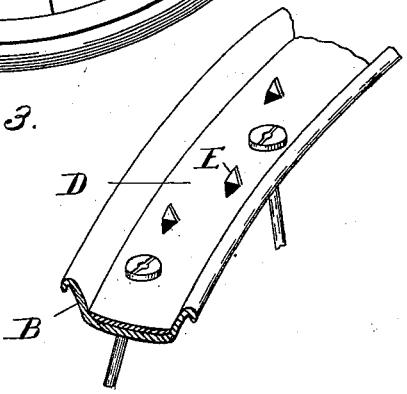
Figure 4:
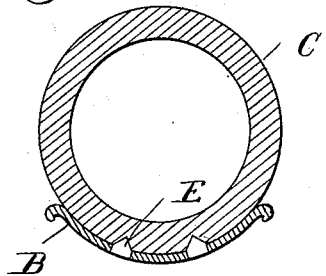

Figure 1 is a sectional elevation of a bicycle wheel provided with a rubber tire secured to the rim in accordance with my invention. Fig. 2 is an enlarged cross-section thereof. Fig. 3 is a detached perspective of a section of the wheel rim, and Fig. 4 is a cross-section of a modified form of wheel.

A is a metallic wheel provided with the rim B and rubber tire C, all of known construction.

In applying my invention to bicycle wheels I ordinarily place upon the rim a metal strip D which preferably extends around the rim and which is provided with a number of outwardly projecting prickers E. These prickers are preferably formed in the well known manner by raising V-shaped portions in the metal strip by means of suitable punches, and it is immaterial whether these prickers are formed in regular or irregular order along the strip, provided they are sharp enough to cut into the base of the tire when the latter is tightly drawn around the rim and numerous enough to hold the tire from displacement on the rim.

In using my invention with so-called pneumatic tires it is evident that the inflation of the tire after placing it upon a wheel rim will tightly draw the tire upon the rim and the prickers will cut their way into the base of the tire so that it will be securely held in place while at the same time it may be readily detached again if the tire is collapsed. It is obvious that the prickers must be of a size which will not injure the tire by cutting through the wall into the air chamber. The strip D is preferably coextensive with the tire and may be secured to the rim in any suitable manner so as to be itself rigidly connected to the rim. In the drawings, I show it fastened by receiving the ends of the metal spokes but other ways may be obviously adapted for the purpose.

I do not intend to confine myself to the construction just described, but I may dispense with the metal strip and form the prickers out of the rim, or provide the rim with prickers in any other suitable way. In the same way the particular form, shape and size and number of distribution of the prickers must be made to suit the construction of the tire and the material from which the tire is made. With solid rubber tires, or with rubber tires which are covered at the base with canvas or other fabric or which are inclosed in a sheath of canvas or like fabric, it is evident that a number of small saw tooth like prickers around the circumference of the rim of the wheel will admirably hold the rim in place provided the rim is of the usual grooved kind.

In using prickers of a saw tooth form, I preferably place the plane of the tooth transversely the rim, so that it will be less apt to tear the material and have more hold on the tire to prevent the creeping.

If it should be necessary to prevent injury to some forms of tires by using my improvement it is obvious that such tires may be provided with a strip of canvas, leather or other fabric cemented to the base, so as to give the prickers a firmer hold upon the tire, or the prickers may be modified by making them without sharp points, or substituting lugs or projections on the tire, and if necessary the tire may be provided at its base with a strip of leather or other fabric provided with holes adapted to engage with the lugs upon the tire.

What I claim as my invention is—

1. In a vehicle wheel, in combination with a yielding tire, of a rim for the tire having a centrally arranged series of outwardly projecting teeth integral therewith, substantially as described.

2. In a wheel the combination with a U-shaped rim, of a separate plate fitted into the base of the rim and having an interspersed series of pointed teeth integral therewith between its edges, and a flexible tire on the rim substantially as described.

3. In wheel tire, the combination with a yielding tire, of a band on which the tire rests having an interspersed integral series of pointed projections thereon extending outwardly and adapted to penetrate the tire, substantially as described.

4. In a wheel tire, the combination with a yielding tire, of a band on which the tire rests, and an interspersed series of pointed projections struck up from the band, between the edges thereof, substantially as described.

In testimony whereof I affix my signature in presence of two witnesses.

PETER GENDRON.

Witnesses:
GEO. M. VOGEL,
WM. A. MILLS.